United States Patent [19]

Burkhart et al.

[11] 4,210,389
[45] Jul. 1, 1980

[54] BOND AND METHOD OF MAKING THE SAME

[75] Inventors: Gordon H. Burkhart; Robert R. Rice, both of Florissant; James R. Teague, St. Charles, all of Mo.

[73] Assignee: McDonnell Douglas Corporation, St. Louis, Mo.

[21] Appl. No.: 960,571

[22] Filed: Nov. 14, 1978

[51] Int. Cl.² .................. H01S 3/00; G02B 5/12; H01L 23/02; B23K 1/00
[52] U.S. Cl. .................. 350/321; 228/122; 228/124; 228/208; 331/94.5 D; 331/94.5 P; 350/288; 357/81; 428/36; 428/630; 428/642; 428/656; 428/666; 428/672; 428/686
[58] Field of Search .......... 331/94.5 D, 94.5 P; 357/81, 82; 228/122, 124, 208; 428/36, 630, 642, 656, 666, 672, 686

[56] References Cited

U.S. PATENT DOCUMENTS

| 3,204,157 | 8/1965 | Peterson | 357/81 |
| 3,391,447 | 7/1968 | Ard | 228/124 |
| 3,711,789 | 1/1973 | Dierschke | 357/82 |
| 3,873,944 | 3/1975 | Vaguine et al. | 228/124 |

*Primary Examiner*—William R. Dixon, Jr.
*Attorney, Agent, or Firm*—Gravely, Lieder & Woodruff

[57] ABSTRACT

A solid state laser rod and a mount through which heat is dissipated from the rod are joined together at a bond comprised of a reflective layer on the surface of the rod, a barrier layer over the reflective layer, and a solder layer between the barrier layer and the mount. The reflective layer may be applied by sputter or other deposition procedures and is highly reflective in the region of the spectrum at which the laser operates, thus insuring optimum efficiency for the rod. The barrier layer may be applied to the reflective layer by the same deposition procedure, and it is impervious to the solder so that the solder does not penetrate it and scavenge the reflective layer. The solder should have a low melting point so as to avoid setting up excessive mechanical stresses in the rod when the solder solidifies. Both the mount and the barrier layer may be covered with a wetting layer prior to soldering to achieve better adhesion of the solder.

18 Claims, 3 Drawing Figures

BOND AND METHOD OF MAKING THE SAME

BACKGROUND OF THE INVENTION

This invention relates in general to optical devices and more particularly to a bond for attaching a crystalline or vitreous optical element to a heat sink that dissipates heat from the element and to method of making the bond.

A solid state laser rod, before it will emit electromagnetic radiation, must be excited by an outside source of energy. This source of energy emits visible or near visible radiation itself which is converted by the laser rod into a laser beam. However, solid state laser rods exhibit relatively small gain, that is, they will convert only a relatively small portion of the energy directed onto them into laser radiation. Much of the remaining energy is converted into heat, and this presents a serious problem because most solid state laser rods operate effectively only below about 30° C., and 50° C. is about the maximum temperature for operation. Above 50° C. they will not lase at all.

Thus, in order for a laser rod to operate at all some provision must be made to dissipate the heat which is generated. Solid state laser rods are presently cooled by water circulated around them, but water cooling presents problems of its own and furthermore is not practical in many applications. Laser rods are also cooled by conducting the heat away from them through their mounts.

Heretofore conductive cooling has presented a wide variety of problems and has not been entirely satisfactory. These problems reside primarily the in bond between the rod and its mount or heat sink as it is often called. Perhaps the most suitable procedure heretofore developed for producing the bond involves depositing a metal on the surface of the rod, depositing another metal on the surface of the heat sink, and soldering the two deposited metals together with a compatible solder. For example, in the case of a yttrium aluminum garnet (YAG) laser rod, gold is deposited on a selected area of the rod by vacuum deposition. Likewise a thin layer of gold is applied to the surface of the mount against which the rod is to be positioned. Usually the mount is copper. Then the mount and rod are joined together at their gold coatings with indium or some other solder.

The foregoing process provides neither a very reliable nor a very predictable bond. Through evaluations made in connection with the development of this invention, the problems in current bonds seem to derive from the tendency of the solder to scavenge some of the metal coating on the rod. Thus, the metal coating does not exist over the entire rod area that is located opposite to the heat sink and is not as strong as it might otherwise be. Also, these bonds tend to degrade with the passage of time. Furthermore, the scavenged areas are not nearly as reflective as the coated areas, and this lowers the gain of the laser rod, for light rays that might otherwise be reflected into the rod and converted into a laser beam are merely absorbed in the solder. Since the scavenged areas vary from mount to mount and even between successive attachments to the same mount, it is impossible to compare laser rods for gain and other characteristics. In other words, any tests run on laser rods mounted in such a manner reflect the gain or efficiency of the rod and its mount and not the rod itself.

SUMMARY OF THE INVENTION

One of the principal objects of the present invention is to provide a bond that securely joins a crystalline or vitreous optical element to a heat sink that is capable of conducting heat away from the optical element. Another object is to provide a bond of the type stated that is ideally suited for mounting a solid state laser rod. A further object is to provide a bond of the type stated that is extremely durable and capable of withstanding long periods of operation as well as repeated cycling. An additional object is to provide a bond of the type stated that is continuous and extends along substantially the entire surface area of the optical element that is located opposite the mount. Another object is to provide a bond of the type stated which is highly reflective as to a solid state laser rod so as not to detract significantly from the gain of the laser rod. Still another object is to provide a bond which has highly predictable characteristics and thus may be used to compare the gain characteristics of different laser rods on the same mount. Yet another object is to provide a process for producing a bond of the type stated. These and other objects and advantages will become apparent hereinafter. The present invention is embodied in a bond including a reflective layer on the surface of a crystalline or vitreous optical element, a barrier layer applied over the reflective layer, and a solder layer between the rod and a heat sink to which the rod is affixed. The barrier layer is impervious to the solder so that the reflective layer is not damaged by the solder. The invention also resides in the process for attaching the optical element to the heat sink, including applying the reflective layer to the optical element, applying the barrier layer to the reflective layer, placing solder between the barrier layer and the heat sink, and melting the solder to create a solder layer. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur

DETAILED DESCRIPTION

Figure 1:
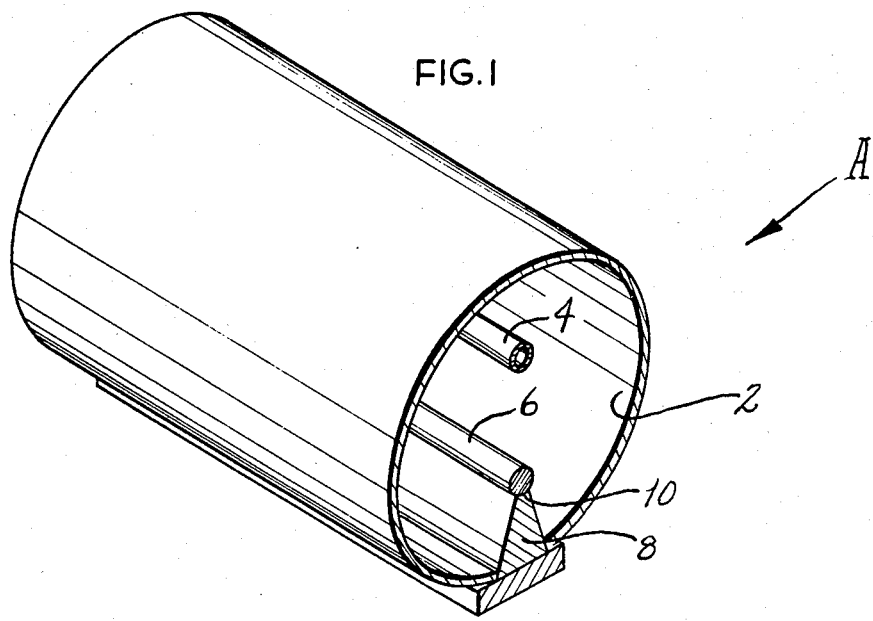
FIG. 1 is a perspective view, partially broken away and in section, of a laser provided with a laser rod that is bonded to its mount in accordance with the present invention.

A laser A (FIG. 1) basically includes an elongated reflector 2 of elliptical cross-sectional configuration, a light source 4 located at one focus of the elliptical reflector 2, a laser rod 6 mounted at the other focus of the reflector 6, and a heat sink or mount 8 that supports the rod 6 in the reflector 2. The mount 8 serves primarily as a heat sink for dissipating heat that develops in the laser rod 6. Since the light source 4 is at one focus of the elliptical reflector 2, the light generated by it is reflected by the reflector 2 such that it is concentrated at the other focus which is where the laser rod 6 is positioned. Thus, most of the light generated by the light source 4 is directed into the laser rod 6 through the side surface of that rod. The laser rod 6, in turn, converts the light into a monochromatic light beam that emanates from the rod 6. The rod 6 is solid throughout and is formed from any one of a number of crystalline substances that are suitable for making laser rods. Yttrium aluminum garnet (YAG) doped with neodymium is one such substance. Two others are yttrium-aluminum-oxygen (YALO) doped with neodymium and lanthanum berylliate (BEL). Thus, the rod 6 constitutes a crystalline optical element. The mount 8 extends from the reflector 2 toward the nearby focus, and the laser rod 6 is attached to the mount 8 such that it is coaxial with the focus. Preferably the mount 8 passes through the reflector 2 at the end thereof, that is, in the region of greatest curvature for the reflector 2. The laser rod 6 and mount 8 are joined together along a bond 10.

Figure 2:
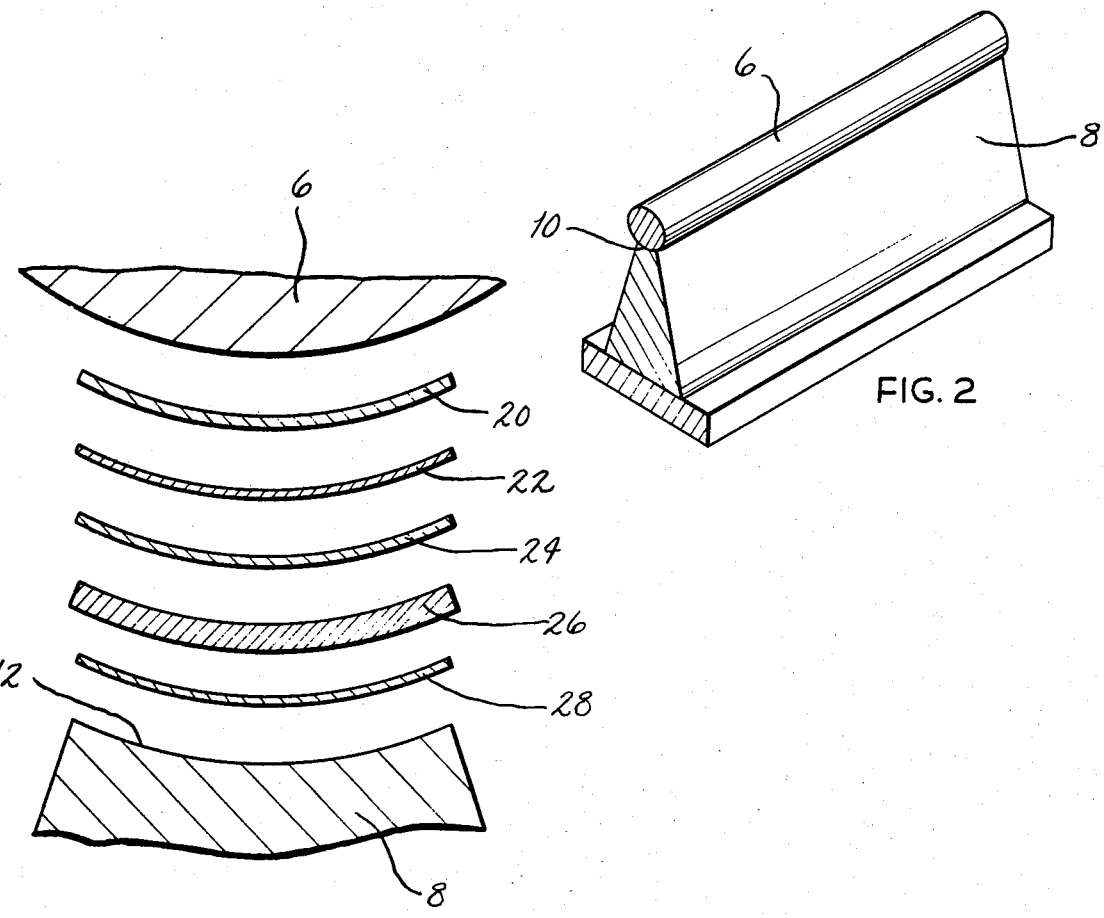
FIG. 2 is a perspective view of the mount and the rod on it.
Figure 3:
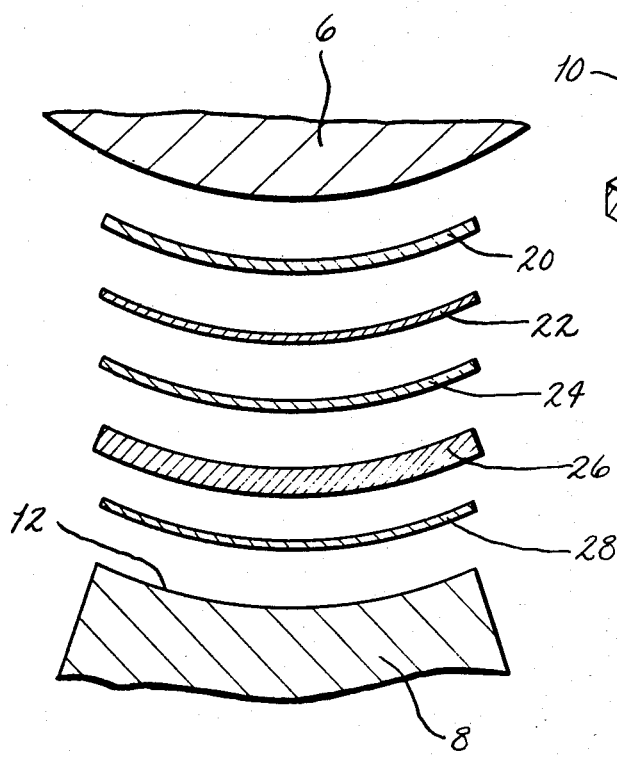
FIG. 3 is an exploded sectional view of the bond.

The mount 8 (FIG. 2) is somewhat trapezoidal in cross-sectional configuration and is made from a solid material that is a good conductor of heat, preferably a metal, and further has expansion characteristics similar to that of the rod 6. In other words, the rod 6 and mount 8 should be a fairly good match insofar as their thermal expansion characteristics are concerned. Copper is an excellent metal for the mount 8. The rod 6 is attached to the small end of the mount 8, where the mount 8 is provided with a concave surface 12 (FIG. 3) which generally conforms to the contour of the rod 6. Preferably, the large end of the mount 8 is located in the region of greatest curvature for the reflector 2, which is the region closest to the focus at which the rod 6 is located. Beyond the reflector 2 the large end of the mount 8 is connected to a suitable device for dissipating the heat absorbed by the mount 8.

The bond 10 consists of (FIG. 3) a reflective layer 20, a barrier layer 22, a wetting layer 24, a solder layer 26, and another wetting layer 28 arranged in that order between the convex outer surface the rod 6 and the concave surface 12 at the small end of the mount 8. The reflective layer 20, barrier layer 22, and wetting layer 24 are all applied to the rod 6 prior to its attachment to the mount 8, while the wetting layer 28 is likewise applied to the surface 12 of the mount 8 before the rod 6 is installed on the mount 8. Then a thin sheet of solder is interposed loosely between the wetting layer 24 on the rod 6 and the wetting layer 28 of the mount 8. With the solder in place, the temperature of the solder is elevated sufficiently to melt it, while the rod 6 and mount 8 are held together. Upon solidifying, the solder becomes the solder layer 26 which bonds the two wetting layers 24 and 28 together, thereby securely attaching the rod 6 to the mount 8. The temperature at which the solder layer 26 melts should be less than the temperatures at which any of the other layers 20, 22, 24 or 28 melt. Nevertheless, that temperature should not be too much greater than the normal operating temperature for the laser A so that the mechanical stresses which develop in the bond 10 as a result of the solidification are as small as possible. In this regard, mechanical stresses in the laser rod 6 affect the optical properties of the rod 6 in a detrimental manner. Generally speaking, the melting temperature for the solder layer 26 should not be more than about 200° C. greater than the maximum operating temperature at which the rod 6 will lase.

The materials of all the layers 20, 22, 24, 26, and 28 are normally metals, but other materials are suitable, provided they have acceptable chemical and physical characteristics. Also the reflective and barrier layers 20 and 22 are different metals, and likewise so are the barrier and wetting layers 22 and 24. The two wetting layers 24 and 26 are usually the same metal, but this is not absolutely necessary. The metal of the solder layer 26 usually differs from the metal of the wetting layers 24 and 26, and the reflective and barrier layers 20 and 22 as well.

Considering now the reflective layer 20, it strongly adheres to the crystalline material of the rod 6 and should have good reflective characteristics at the pumping wavelength for the rod 6. This insures that light which is generated in the rod 6 is not merely absorbed by the mount 8, but is instead reflected back into the rod 6 so as to be useful in producing laser radiation. Generally speaking, the metal of the reflective layer 20 should have a reflectivity of at least about 90% in the narrow band of the spectrum at which the laser rod 6 operates. In addition the metal of reflective layer 20 should not chemically react with the substance from which the rod 6 is formed. Normally the material of the reflective layer 20 is a metal, the particular metal being dependent on the material from which the rod 6 itself is formed. The layer 20 should range between 1000 Å and 2000 Å in thickness.

preferably , the metal of the reflective layer 20 is applied to the surface of the rod 6 by sputter deposition, for this procedure provides a good bond between the metal and the crystalline material of the rod 6. Generally speaking, to achieve a sputter deposition, the rod 6 and the metal which is to be deposited on it are placed into a vacuum chamber which is almost entirely evacuated. Then the chamber is back filled with an inert gas such as argon until its reaches a pressure of about $10^{-4}$ in.Hg., and this gas is excited at radio frequency to establish a plasma in the vacuum chamber. Thereupon, the surface of the rod 6 is cleaned by sputter etching, and this involves bombarding the surface with an electron beam so that all impurities are removed from it. Then, the metal of the reflective layer 20 is deposited on the rod 6 by RF sputtering, in which case the Argon ions bombard the metal atoms, sputtering them into the vacuum chamber toward the rod and causing them to strike the surface of the rod 6 with sufficient force for them to embed in or adhere tightly to the rod 6. In this regard, the rod 6 is masked so that only a selected portion of it, that is the portion at which the bond 10 is to be formed, is exposed to the plasma. In sputter deposition the molecules or atoms of metal are very energetic and are literally driven into the surface of the rod 6 to create a very secure bond between the two. Other types of deposition procedures such as ion beam deposition and vapor deposition are suitable, with the former being preferred because it produces a stronger bond.

In the case of a yttrium aluminum garnet (YAG) rod doped with neodymium, gold is an excellent metal for the reflective layer 20, for a YAG rod emits radiation in the infrared region and gold is about 99% reflective in that region. Furthermore gold is inert to the crystalline material of the rod 6 and therefore does not react chemically with that material. Other metals are also available for the reflective layer 20, and the choice of metal to a large measure depends on the substance of the laser rod 6 and the wavelength at which it operates. Some other suitable metals are silver, aluminum, and rhodium. A metal-dielectric combination having metal strata and dielectric strata joined together is also suitable for the reflective layer 20.

The barrier layer 22 serves to isolate the reflective layer 20 from the solder of the solder layer 26 so that the reflective layer 20 is not in any way damaged or scavenged by the solder. In this regard, in order for the laser rod 6 to operate most efficiently, the reflective layer 20 must remain fully intact and highly reflective. The barrier layer 22 should be generally impervious to the solder and incapable of being dissolved by it. It should also be capable of bonding securely to the reflective layer 20 and should be chemically inert as to the reflective layer 20. The two layers 20 and 22, in other words, should be physically and chemically compatible. Normally, the barrier layer 22 is a metal which is applied to the reflective layer 20 by sputter deposition or some other suitable deposition procedure. Generally speaking, the refractory metals such as titanium and tungsten are well suited for the barrier layer 22, as is the nickel-iron-chromium-carbon alloy which is sold under the trademark Nichrome. The particular metal that is selected for the barrier layer 22 is dependent to a large measure on the particular metal of the reflective layer 20 and the solder that is used in the solder layer 26, for it must be compatible with both. The barrier layer 22 should be at least 3500 Å thick.

Where the reflective layer 20 is gold and the solder is indium, Nichrome is an excellent metal for the barrier layer 22. The Nichrome should be applied until the barrier layer 22 is approximately 3500 Å thick. On the other hand, titanium makes an excellent barrier layer where the silver is reflective layer and indium is the solder.

Most refractory metals are not easily wetted by solders, at least solders of the type suitable for use with the rod 6, and where this is the case a wetting layer 24 is applied to the barrier layer 22. Normally the wetting layer 24 is a metal which may be firmly applied to the barrier layer 22 such as by sputter or ion beam deposition. It should further not react readily with the atmosphere and should bond easily to the solder. It makes little difference if the wetting layer 24 is partially scavenged by the solder, since the barrier layer 20 is impervious to the solder and therefore prevents the reflective layer 20 from being damaged. The wetting layer 24 may be very thin, ranging in thickness between 500 Å and 1000 Å. Where the solder easily wets and adheres to the barrier layer 22, the wetting layer 24 may be omitted.

Gold is an excellent metal for the wetting layer 24 where the barrier layer 22 is Nichrome. Platinum is also acceptable.

The other wetting layer 28, which is applied to the concave surface 12 of the mount 8 serves the same purpose, that is, it permits the mount 8 to be easily wetted by the solder of the solder layer 26. What has been said with respect to the wetting layer 24 applies equally as well to the wetting layer 28. Usually, the wetting layer 28 is the same metal as the wetting layer 24. Where the solder easily wets the metal of the mount 8, the wetting layer 28 need not be present.

Where the mount 8 is made from copper and the solder is indium, again gold is an excellent metal for the wetting layer 28. In this instance the wetting layer 28 should be between 500 Å and 100Å thick.

The solder of the solder layer 26 should, of course, be compatible with the two wetting layers 24 and 28 in the sense that it will bond firmly to them, creating a strong mechanical bond. Furthermore, upon solidifying it should induce as little stress in the bond 10, and likewise the laser rod 6, as possible, since mechanical stresses in the rod 6 will adversely affect its operation. For this reason it is desirable to use a solder that has a low melting point—one that melts only slightly above the normal operating temperature of the rod 6. More specifically, the melting temperature of the solder should be no greater than about 200° C. higher than the maximum operating temperature of the rod 6, that is the maximum temperature at which it will lase effectively.

Normally the metal of the solder layer 26 is supplied in sheet form, with the sheet ranging from 0.0015 in. to 0.0025 in. in thickness. The thin sheet of solder is placed between the concave surface 12 on the mount 8 and the outside surface of the laser rod 6, or more specifically between the wetting layer 28 on the surface 12 and the wetting layer 24 on the rod 6. Then, while the rod 6 and mount 8 are held gently together, the entire arrangement is heated to a temperature slightly above the melting temperature of the solder. Thus, the solder melts. Thereafter the solder is allowed to cool, and when it solidifies it firmly joins the two wetting layers 24 and 28 and in effect secures the rod 6 firmly to the mount 8.

Indium, either elemental or alloy, is an excellent solder where the two wetting layers 24 and 28 are gold. In this regard, elemental indium melts at 156.6° C. Tin and alloys of tin are also acceptable for the solder layer 26.

To eliminate all stresses at the solder layer 26, the solder of that layer may be a substance that is liquid above the normal operating temperature of the rod 6, but solidifies at the operating temperature. Some metal alloys have these properties. In this case, some other device is required to hold the rod 6 against the mount 8.

The bond 10 is extremely durable and has under testing remained intact for in excess of 500 hours of laser rod operation. This operation involved repeated start-ups, and the bond 10 withstood the expansions and contractions associated with the cycling without any difficulty. The bond 10 and mount 8 bore no evidence of corrosion. Also the laser rod 6 obtained 10% to 15% higher gain when mounted with the bond 6 as compared to a conventional bond in which the solder is directly against the layer that is deposited on the rod.

The bond 10 is not limited exclusively to lasers, but may be used in other applications where heat is to be conducted away from an optical element that is subjected to a significant amount of optical power. Mirrors and reflecting prisms to which large amounts of laser radiation are directed are examples of vitreous optical elements with which the bond 10 may be used.

This invention is intended to cover all changes and modifications of the example of the invention herein chosen for purposes of the disclosure which do not constitute departures from the spirit and scope of the invention.

What is claimed is:

1. In combination with a crystalline or vitreous optical element that is subjected to significant optical power and a solid heat sink for conducting heat away from the optical element, an improved bond between the optical element and the heat sink for securing the optical element to the heat sink, said bond comprising: a reflective layer located directly against and adhered to the surface of the optical element, the reflective layer being highly reflective to radiation in the region of the spectrum at which the optical element operates; a solder layer between the reflective layer and the heat sink; and a barrier layer between the solder layer and reflective layer and being adhered to the reflective layer, the barrier layer being substantially impervious to the solder of the solder layer so that the solder does not penetrate it and scavenge the reflective layer.

2. The structure according to claim 1 and further comprising a first wetting layer directly against and adhered to the barrier layer, the first wetting layer being a different material than the barrier layer, and the solder of the solder layer being directly against and adhered to the first wetting layer.

3. The structure according to claim 2 and further comprising a second wetting layer directly against and adhered to the heat sink, the second wetting layer being a different material than the mount, and the solder layer being directly against and adhered to the second wetting layer.

4. The structure according to claim 3 wherein the solder of the solder layer is a different material from the material of the first and second wetting layers, and has a melting temprature higher than the temperature at which the optical element normally operates, but lower than the melting temperatures of the reflective, barrier, and wetting layers.

5. The structure according to claim 4 wherein the reflective layer is gold, the barrier layer is Nichrome, the first and second wetting layers are gold, and the solder layer is indium.

6. The structure according to claim 1 wherein the reflective layer, the barrier layer, the solder layer and the mount are all metal.

7. The structure according to claim 6 wherein the melting temperature of the solder layer is above the temperature at which the optical element normally operates and is below the melting temperatures of the reflective layer and barrier layer and is also below the melting temperature of the mount.

8. The structure according to claim 7 wherein the melting temperature of the solder layer is no more than 200° C. greater than the maximum temperature at which the optical element will operate effectively.

9. The structure according to claim 1 wherein the reflectivity of the reflective layer is at least 90% in the region of the spectrum at which the optical element operates 10. The structure according to claim 1 wherein the reflective layer is applied to the surface of the optical element by sputter deposition.

11. The structure according to claim 1 wherein the optical element is a solid crystalline laser rod.

12. A method of attaching a crystalline or vitreous optical element to a heat sink that is capable of conducting heat away from the optical element, said method comprising applying a reflective layer of metal to the crystalline or vitreous surface of the optical element, the reflective layer being highly reflective as to radiation in the region of the spectrum at which the optical element operates; applying a barrier layer to the reflective layer; placing a solder material between the barrier layer and the heat sink; and melting the solder layer to create a bond in the form of a solder layer between the barrier layer and the heat sink, the barrier layer being substantially impervious to the solder of the solder layer so that the reflective layer remains isolated from and unaffected by the solder.

13. The method according to claim 12 and further comprising: applying a first wetting layer directly to the barrier layer, the first wetting layer being a different material than the barrier layer and being easily wetted by the solder when the solder is molten; and wherein the solder is applied directly against the first wetting layer.

14. The method according to claim 13 and further comprising applying a second wetting layer directly to the heat sink, the second wetting layer being a different material than the material of the heat sink and being easily wetted by the solder when the solder is molten, and wherein solder is applied directly against the second wetting layer.

15. The method according to claim 12 wherein the melting temperature of the solder is above the normal operating temperature of the optical element, but below the melting temperatures of any of the reflective or barrier layers.

16. The method according to claim 12 wherein the reflective layer is applied to the crystalline or vitreous surface of the optical device by sputter deposition.

17. The method according to claim 16 wherein the barrier layer is applied to the reflective layer by sputter deposition.

18. The method according to claim 12 wherein the optical element is a solid crystalline laser rod.

* * * * *